3,007,909
POLYMERIZATION OF OLEFINS
Bernhard Raecke, Dusseldorf, Germany, assignor to Henkel & Cie. G.m.b.H., Dusseldorf-Holthausen, Germany, a corporation of Germany
No Drawing. Filed Sept. 18, 1957, Ser. No. 684,633
Claims priority, application Germany Sept. 27, 1956
5 Claims. (Cl. 260—94.9)

This invention relates to the polymerization of olefins, and more particularly to the polymerization of aliphatic olefins in the presence of titanium halides and metallic aluminum, amalgamated aluminum and/or aluminum carbide and small amounts of polar substance.

It is known that olefins, such as ethylene, propylene and the like, may be polymerized into high-molecular thermoplastic substances in the presence of polymerization catalysts, such as aluminum chloride, metal oxides, for example chromium oxide or molybdenum oxide, peroxides or aluminum alkyls. These known processes have been carried out at elevated pressures, particularly in the range between extremely high pressures and atmospheric pressure.

I have found that polymerizable aliphatic olefins can be transformed into high-molecular thermoplastic polymers by heating them to elevated temperatures in the presence of titanium halides and metallic aluminum and small amounts of a polar substance. The metallic aluminum may be partially or entirely replaced by aluminum carbide or by aluminum amalgam.

Polymerizable olefins which may be used for the process according to the invention include, for example, ethylene, propylene, 1-butene, 1-pentene, 1-hexene, isobutylene, 3-methyl-butene-1, 4-methyl-pentene-1, 4-methyl-hexene-1, 5-methyl-hexene-1, and the like. It is not necessary to employ particularly pure olefins. Mixtures of olefins with other hydrocarbons as well as mixtures of various olefins may be used; under these circumstances, copolymerization takes place to a varying degree. A certain minimum concentration of olefin is necessary for the polymerization. Consequently, if gaseous, low-boiling-point, lower aliphatic olefins are used, the reaction is carried out under pressure in an autoclave in the presence of inert solvents. The pressure of the olefin, for example ethylene, does not need to be very high. Initial pressures of about 20 atmospheres gauge are sufficient. It is, however, also possible to work under much higher pressures; the upper limits of pressure are merely determined by the available apparatus, such as pumps, autoclaves and the like.

Hydrocarbons, such as low-boiling-point petroleum fractions of all kinds, paraffin oil, molten paraffin waxes, benzene, and the like, have been found to be useful as inert solvents. Their use offers the further advantage that they absorb some of the substantial heat of polymerization.

The optimum polymerization temperature depends upon the activity of the polymerization catalyst used. In some cases it was observed that the polymerization sets in at temperatures slightly above 100° C. However, the starting mixture may also be heated to temperatures of 150–170° C. and still higher, whereby the polymerization reaction is released with certainty and may be brought to completion.

The polymerization goes to completion after a short period of time. In general, the reaction mixture is held at the reaction temperature as long as polymerization is taking place, which can readily be determined by a decrease of the pressure. The reaction may, however, also be interrupted prior to completion, and the unreacted olefin may be recovered from the reaction mixture.

The ratio between aluminum carbide or aluminum and titanium salt may vary over wide limits. A ratio of 10 parts by weight aluminum carbide or aluminum to 5–30 parts by weight titanium halide, particularly titanium tetrachloride, is preferred. A particularly advantageous procedure comprises suspending the catalyst in about 15–30 times its quantity of inert solvent, and maintaining the mixture in motion by means of stirring devices or by shaking or rotating the reaction vessel.

The aluminum may be employed in the form of a powder, shavings, wire, ribbon, rings, and the like. It is sometimes advantageous to remove the thin oxide coating on the metallic aluminum by a short treatment with acids or alkalies. The aluminum may also be activated in accordance with known methods, for example by amalgamating it. The aluminum carbide is advantageously used in the form of a powder.

I have further discovered that the effect of the catalyst mixture can be made still more pronounced by the addition of small amounts of a polar substance to the reaction mixture. The addition of the polar substance has the effect that the polymerization reaction is rapidly released at lower temperatures. Such polar substances are, for example, water, salt solutions, acids, such as hydrofluoric acid, hydrochloric acid, phosphoric acid or acetic acid, alcohols, ketones, such as acetone, esters and the like. The amount of activating polar material added to the catalyst need not be large; in general it amounts to 0.2–2% by weight of the catalyst. The optimum quantitative ratio may readily be determined by a few preliminary experiments.

The transformation of polymerizable aliphatic olefins into high-molecular polymers in the presence of aluminum carbide or aluminum and titanium halides, and in the presence of small amounts of a polar substance, may be carried out particularly advantageously if an organic halogen compound is used as the polar substance.

The organic halogen compound may contain one or more halogen atoms in the molecule. Examples of suitable organic halogen compounds are methyl chloride, ethyl chloride, chloropropane, chloroacetic acid ethyl ester, benzyl chloride, ethyl bromide, ethylene dibromide, trichloroethylene, bromobenzene, chloroacetone, allyl chloride, and the like.

The optimum quantitative ratio for each case may readily be determined by a few preliminary tests. In general, the quantity of organic halogen compound added to the reactants is small and amounts to only a few percentage points of the total weight of the catalyst mixture.

The polymerization reaction according to the present invention may be carried out as a batch process as well as a continuous process.

The reaction product may be worked up in very simple fashion. The solvent components may be removed by simple squeezing, distillation, steam distillation, washing with alcohols, ethers, acetone, or the like known methods, while the inorganic components may be separated by treatment with water or aqueous solutions, for example aqueous acids, or also with alkalies. The yellow-to-brownish discoloration of the polymerized olefin obtained by the reaction is substantially removed thereby.

It is also possible to react the primarily formed metal-organic compound with other substances instead of with compounds containing hydroxyl groups. Such compounds are, for example, oxygen, ozone, hydrogen peroxide, halogens, such as chlorine or bromine, cyanide, thiocyanide and the like. Polar groups are thereby introduced as terminal groups into the polyolefins.

The nature and properties of the polymeric olefins depend upon the starting materials, the composition and quantity of the catalyst as well as on the reaction conditions. Liquid, viscous, resinous and solid products may be obtained thereby. A special advantage is that high-polymeric products are obtained in solid form.

The presence of substantial quantities of aluminum chloride during the production of the solid products has been found to be harmful, because substantial amounts of liquid polymerization products are formed thereby. Moreover, solid polymerizates produced under such conditions are much less uniform, which is manifested, for example, by the fact that they exhibit a rather undefined melting point.

The solid polymerization products have a relatively high melting point. Sometimes they exhibit a definite fibrous texture, even in their unpurified form. They are obtained in the form of felted fibers, and sometimes they resemble asbestos in appearance. They may, if desired, be further purified by reprecipitation from solvents.

The solid polymerized olefins may be used in the production of foils, coverings, fibers and threads, as insulating and packaging material, for the production of containers, tubes, plates, shaped articles, plastic coatings on metals, etc. Liquid components of the polymerization products may be used as lubricants and oil additives.

The following examples will further illustrate the present invention and enable others skilled in the art to understand the present invention more completely. It will be understood, however, that my invention is not limited to the particular examples given below.

Example I 360 gm. of a petroleum hydrocarbon fraction having a boiling point of 110–140° C. were placed into an autoclave having a net volume of 1.7 liters and provided with an iron lining and a stainless steel stirring device. Thereafter, 6 gm. aluminum carbide and 6 cc. titanium tetrachloride were added. The autoclave was then closed and the air contained therein was removed by flushing with nitrogen. Subsequently, commercial grade ethylene was forced into the autoclave from a steel cylinder until the pressure in the autoclave reached 61 atmospheres gauge. The pressure dropped to about 35 atmospheres gauge, whereupon more ethylene was introduced until the pressure again reached 62 atmospheres gauge. The pressure again dropped to 49 atmospheres gauge and was once more raised to 62 atmospheres gauge by introducing additional ethylene. The temperature of the contents was raised to 150° C. within a period of 1½ hours, and then maintained at 150–156° C. for 3 hours. The maximum internal pressure developed thereby was 118 atmospheres gauge at 148° C. After allowing the contents to cool to 34° C., the pressure dropped to 42 atmospheres gauge. Thereafter, the brown contents of the autoclave, which weighed 537 gm. and turned white upon contact with the air, were comminuted into a powder and stirred twice with 600 cc. portions of ethanol. The solid components were removed by suction filtration and dried. The yield was 183 gm. 20 gm. of this raw polyethylene were dissolved by boiling the same with trichloroethylene under reflux, the resulting solution was filtered and the polyethylene was reprecipitated from the filtrate by adding methyl alcohol thereto. The reprecipitated polyethylene was separated from the liquid phase by vacuum filtration and dried. It had a melting point of 125° C.

Example II 360 gm. of a petroleum hydrocarbon fraction having a boiling point of 110–140° C., 6 gm. aluminum carbide and 6 cc. titanium tetrachloride were placed into the autoclave mentioned in the preceding example. The autoclave was then flushed with nitrogen, and ethylene was introduced under pressure until the internal pressure reached 56 atmospheres gauge. The pressure dropped to 33 atmospheres gauge, whereupon more ethylene was introduced until the pressure again stood at 56 atmospheres gauge. The contents of the autoclave were then heated to a temperature of 100–101° C. within a period of 2 hours, and maintained at that temperature for about 3 hours. The maximum internal pressure developed thereby was 72 atmospheres gauge. After allowing the contents to cool to 32° C., the internal pressure dropped to 17 atmospheres gauge. The cooled contents were solid throughout and weighed 485 gm. The raw product had an asbestos-like, fibrous texture. The raw product was again worked up by washing with methyl alcohol and drying, whereby 73 gm. raw polyethylene were obtained. The raw polyethylene was purified by reprecipitation from perchloroethylene. The white purified product had a melting point of 124–125° C.

The above procedure was repeated, except that ethylene was reintroduced a second time into the autoclave until the internal pressure reached 60 atmospheres gauge. In this case a maximum pressure of 97 atmospheres gauge was reached at 102° C., while the terminal pressure at 28° C. was 47 atmospheres gauge. 91 gm. raw polyethylene were obtained.

Example III

The starting materials in this run were the same as those in Example II, except that 2 drops of water (0.1 gm.) were added thereto. Ethylene was introduced under pressure until the internal pressure reached 58 atmospheres gauge. After the pressure dropped to 33 atmospheres gauge, more ethylene was introduced until the pressure reached 55 atmospheres gauge, and when the pressure again dropped to 41 atmospheres gauge, a pressure of 55 atmospheres gauge was restored by introducing still more ethylene. The contents were then heated to a temperature of 150° C. The maximum internal pressure of 95 atmospheres gauge was reached at 145° C. After further heating to 152° C., the pressure dropped to 64 atmospheres gauge. Upon cooling the autoclave to 30° C., the pressure dropped to 32 atmospheres gauge. After working up the solid contents of the autoclave, which weighed 483 gm., in the manner described in the preceding examples, 111 gm. raw polyethylene were obtained. Upon purifying the raw product in the manner described above with perchloroethylene, the melting point of the polyethylene was 126–128° C.

Example IV

The same starting materials, i.e. 360 gm. petroleum hydrocarbon fraction, 6 gm. aluminum carbide and 6 cc. titanium tetrachloride, as in Example II were used for this run, except that 4 drops acetone (0.08 gm.) were added thereto. The initial ethylene pressure was 60 atmospheres gauge. After the pressure dropped to 46 and 56 atmospheres gauge, respectively, additional ethylene was introduced each time to raise the pressure again to 60 atmospheres gauge. The contents were then heated to 115° C. within a period of 2 hours, whereby a maximum internal pressure of 100 atmospheres gauge developed. While the pressure steadily decreased to 73 atmospheres gauge, the temperature rose to 134° C. The autoclave was allowed to remain at this temperature for about two hours. After allowing the autoclave to cool to 35° C., the pressure was 33 atmospheres gauge. The solid contents of the autoclave, which weighed 519 gm., turned light-grey upon contact with the air. After washing with methanol and drying the raw product, 160 gm. practically white polyethylene were obtained. Upon purification by reprecipitation from perchloroethylene, it had a melting point of 125° C.

When the quantity of acetone added was reduced by one-half, i.e. when only 2 drops (0.04 gm.) were added, 142 gm. raw polyethylene were obtained under otherwise identical conditions.

Example V 180 gm. of a petroleum hydrocarbon fraction having a boiling point of 110–140° C. were placed into an autoclave having a net volume of 1 liter, provided with an iron lining and a stainless steel stirring device. Thereafter, 6 gm. aluminum in the form of aluminum shavings and 6 cc. titanium tetrachloride were added thereto.

The autoclave was closed and the air therein was displaced by flushing with nitrogen. Subsequently, commercial grade ethylene was introduced into the autoclave under pressure from a steel cylinder until the pressure in the autoclave reached 50 atmospheres gauge. A few minutes later the pressure had dropped to 36 atmospheres gauge, while the temperature rose from 30° C. to 34° C. Additional ethylene was introduced until the pressure again reached 50 atmospheres gauge. Thereafter, the autoclave was heated so that the temperature rose to 152° C. within a period of one hour. At 141° C. the internal pressure reached a maximum value of 89 atmospheres gauge and then dropped to 51 atmospheres gauge at 151° C. The terminal pressure at 32° C. was 24 atmospheres gauge. After allowing the autoclave to cool completely, the raw reaction product, which was partly solid and partly liquid, was admixed with methyl alcohol and the mixture was stirred for a short time. Thereafter, the solid components were separated by vacuum filtration and dried at 80° C. The dried product (22 gm.) was dissolved in hot perchloroethylene (500 cc.), the solution was filtered while hot, and the polyethylene was reprecipitated from the filtrate with methanol. The precipitated polyethylene was separated by vacuum filtration and dried. It had a melting point of 124° C.

*Example VI*

The starting materials for this run were the same as those used in Example V, except that 2 drops of concentrated hydrochloric acid (0.13 gm.) were added to the petroleum hydrocarbon fraction. The initial ethylene pressure was 51 atmospheres gauge. The first time the pressure dropped to 32 atmospheres gauge, and the second time to 36 atmospheres gauge. Each time additional ethylene was introduced to restore the pressure to 51 atmospheres gauge. The autoclave was then heated to 140° C. within a period of 1 hour, whereby a maximum pressure of 117 atmospheres gauge developed. Thereafter, the autoclave was maintained at a temperature of 150–155° C. for three hours. When the temperature reached 152° C. the pressure dropped to 38 atmospheres gauge. The terminal pressure at 30° C. was 15 atmospheres gauge. Upon cooling, the asbestos-like contents of the autoclave were worked up by treatment with acetone. 89 gm. raw polyethylene in the form of felted fibers were obtained. After redissolving the raw product in perchloroethylene and reprecipitating it with methanol, the purified polyethylene had a melting point of 124–125° C.

*Example VII*

360 gm. of a petroleum hydrocarbon fraction having a boiling point of 110–140° C. were placed into an autoclave having a net volume of 1.7 liters, provided with a stainless steel stirring device and an iron lining. 6 gm. aluminum in the form of a cut-up aluminum ribbon, 6 cc. titanium tetrachloride, 4 drops (0.1 gm.) alcohol and 0.5 mercuric chloride were added thereto. The aluminum had previously been thoroughly admixed with the mercuric chloride in a mortar. The air was displaced from the autoclave by flushing with nitrogen. Ethylene was introduced three times, as previously described, until the pressure remained at 63 atmospheres gauge; the pressure after the first time dropped to 42 atmospheres gauge and after the second time to 50 atmospheres gauge. The autoclave was heated to a temperature of 150° C. within a period of 130 minutes. The maximum pressure was 112 atmospheres gauge at 122° C. The autoclave was maintained at a temperature of 150–164° C. for three hours, during which the pressure dropped slowly to 91 atmospheres gauge at 164° C. The terminal pressure at 32° C. was 42 atmospheres gauge. Upon cooling, the raw product was worked up in the customary manner with methanol. 125 gm. raw polyethylene were obtained. 10 gm. of this raw polyethylene were purified by redissolving it in perchloroethylene and reprecipitating it with methanol. The purified polyethylene had a melting point of 124–125° C.

*Example VIII*

360 gm. of a petroleum hydrocarbon fraction having a boiling point of 110–140° C. were placed into the 1.7-liter autoclave mentioned in Example VII. 6 gm. aluminum amalgam, which was produced in accordance with Houben-Weyl, "Die Methoden der Organischen Chemie," Third edition (1925), volume 2, page 256, 6 cc. titanium tetrachloride and 1 drop (0.05 gm.) water were added thereto. The autoclave was flushed with nitrogen, as previously described, and then ethylene was introduced into the autoclave until the internal pressure reached 62 atmospheres gauge. The pressure was restored twice by introducing additional ethylene after the pressure had dropped to 42 and 50 atmospheres gauge, respectively. On introduction of the ethylene, the temperature of the autoclave rose from 25° C. to 33° C. Thereafter, the contents were heated to 148° C. within a period of 1½ hours. The maximum pressure of 107 atmospheres gauge developed at 135° C. When the temperature reached 153° C., heating was discontinued. The temperature continued to rise to 168° C., but the internal pressure dropped to 84 atmospheres gauge. The autoclave was allowed to cool slowly. Ethylene continued to be consumed, as indicated by the continuing decrease of the internal pressure. When the temperature reached 28° C., the pressure was 20 atmospheres gauge. After the contents had completely cooled and the reaction product was worked up as described above, 218 gm. raw polyethylene were obtained. Upon purification of the raw polymer by the method described in the preceding examples, it had a melting point of 124–125° C. The polyethylene was pure white.

A similar run in which, however, only 4 gm. aluminum amalgam, 4 cc. titanium tetrachloride and one drop of water were added to the same amount of petroleum hydrocarbon fraction, yielded 107 gm. raw polyethylene. Upon purification it also had a melting point of 124–125° C.

*Example IX*

360 gm. of a petroleum hydrocarbon fraction having a boiling point of 110–140° C. were placed into an autoclave having a net volume of 1.7 liters, and 1 gm. aluminum amalgam, 1 gm. freshly prepared aluminum chloride and 6 cc. titanium tetrachloride were added thereto. After flushing the autoclave with nitrogen, ethylene was introduced until the internal pressure reached 52 atmospheres gauge. The pressure first dropped to 33 atmospheres gauge, whereupon it was raised to 65 atmospheres gauge by introducing additional ethylene. Thereafter it dropped again to 48 atmospheres gauge and was raised to 60 atmospheres gauge with more ethylene. The temperature of the contents rose from 24° C. to 32° C. The autoclave was then heated to 155° C. within a period of 2 hours, whereby a maximum internal pressure of 140 atmospheres gauge developed. The contents of the autoclave were then held at a temperature of 155–167° C. for four hours, during which period the pressure dropped to 99 atmospheres gauge at 157° C. The terminal pressure upon cooling was 41 atmospheres gauge at 31° C. The contents were allowed to cool completely and the raw polymerization product was worked up with methanol, as previously described. 62 gm. raw polyethylene were obtained which, upon purification in accordance with the procedure described in the preceding examples, had a melting point of 125° C. 48 gm. of a brownish-black oily residue were isolated from the solvent.

*Example X*

180 gm. of a petroleum hydrocarbon fraction having a boiling point range of 110–140° C. were placed into an autoclave having a net volume of 1 liter, provided with an iron lining and a stainless steel stirring device. 6 gm. powdered aluminum and 6 cc. titanium tetrachloride were added thereto. Thereafter, 4 drops ethylene bromide were added to the mixture. The autoclave was closed and the air contained therein was flushed out with nitrogen. Subsequently, ethylene was forced into the autoclave from a steel cylinder until the internal pressure reached 72 atmospheres gauge. The autoclave was then slowly heated so that the temperature of its contents rose to 160° C. within a period of one hour and ten minutes. The contents were thereafter kept at 160–170° C. for six hours. The maximum internal pressure registered during that period was 159 atmospheres gauge at 150° C., but it dropped to 39 atmospheres gauge at 164° C. Upon cooling, the terminal pressure was 19 atmospheres gauge at 36° C. After completely cooling the contents, the partly solid and partly liquid raw reaction product was stirred several times with methanol, the solid components were filtered off by vacuum filtration and finally dried at 80° C. 138 gm. olive-green raw polyethylene were obtained. It was purified by dissolving it in and reprecipitating it from perchloroethylene, whereby its color was materially lightened. The melting point of the purified polyethylene thus obtained was 125–126° C.

Similar results were obtained when 6 gm. aluminum carbide instead of powdered aluminum were used. Upon cooling of the autoclave contents, whereby the pressure dropped to 30 atmospheres gauge, the reaction products were found to be solid throughout. After purification the slightly discolored polyethylene had a melting point of 124° C.

Prior to opening the autoclave in the above run, the remaining ethylene was pumped into another autoclave for re-use in another polymerization run as herein disclosed.

*Example XI*

180 gm. of a petroleum hydrocarbon fraction having a boiling point range of 110–140° C. were placed into an autoclave having a net volume of 1 liter, and 6 gm. aluminum powder, 6 cc. titanium tetrachloride and 2 cc. trichloroethylene were added thereto. The autoclave was closed, and the air therein was displaced by flushing with nitrogen. Thereafter, ethylene was introduced until the internal pressure reached 72 atmospheres. The contents were then heated to 150° C. and maintained at that temperature for 3 hours. The maximum pressure developed during that time was 108 atmospheres gauge. Upon cooling, the pressure was 14 atmospheres gauge. The raw polymerization product was stirred with 90% methanol, filtered off by vacuum filtration and dried at 80° C. 144 gm. fibrous, yellowish-green raw polyethylene were obtained, which were purified by dissolution in and reprecipitation from perchloroethylene. The melting point of the purified polyethylene was 122° C.

Similar results were obtained by substituting 6 gm. aluminum carbide for the aluminum powder in the above run, but the raw polymerization product as well as the end product was much lighter in color.

The trichloroethylene may also be replaced by 2–4 cc. chloroacetic acid ethyl ester.

*Example XII*

360 gm. of a petroleum hydrocarbon fraction having a boiling point range of 110–140° C., 12 gm. aluminum powder, 12 cc. titanium tetrachloride and 2 cc. epichlorohydrin were placed into an autoclave having a net volume of 1.7 liters. Thereafter, the autoclave was flushed with nitrogen and ethylene was introduced until the internal pressure reached 68 atmospheres gauge. The pressure dropped to a somewhat lesser value and was restored to 68 atmospheres gauge by introduction of additional ethylene. The autoclave and its contents were then heated to 185° C., whereby a maximum pressure of 210 atmospheres gauge developed. The terminal pressure after cooling was 22 atmospheres gauge. The contents were washed with methanol and then with dilute hydrochloric acid, and were finally dried at 80° C. 230 gm. raw, slightly grey polyethylene, which had a partially fibrous texture, were obtained. After purification by dissolving it in and reprecipitating it from perchloroethylene, the polyethylene had a melting point of 128° C.

Substantially the same results were obtained when aluminum carbide was used instead of powdered aluminum. The purified polyethylene had a melting point of 125° C.

Moreover, the same results were obtained when benzyl chloride was substituted for the epichlorohydrin in either of the above runs. When 2 cc. bromobenzene were substituted in these runs for the epichlorohydrin, the raw polymerization product consisted practically completely of long fibers.

While I have illustrated my invention with the aid of certain specific embodiments, it will be apparent to those skilled in the art that the present invention is not limited to these embodiments, and that various changes and modifications may be made without departing from the spirit of the invention or the scope of the appended claims.

I claim:

1. The method of polymerizing lower alkenes to produce predominately solid polymers which comprises heating said alkenes in an inert atmosphere to a temperature upward of 100° C. at a pressure of at least 20 atmospheres gauge in the presence of a catalyst composition selected from the group consisting of (1) aluminum carbide, titanium tetrahalide and, as an activating agent, an organic halogen compound; (2) aluminum carbide, titanium tetrahalide and, as an activating agent, water; (3) aluminum carbide, titanium tetrahalide and, as an activating agent, an alcohol; (4) aluminum, titanium tetrahalide and, as an activating agent, water; (5) aluminum, titanium tetrahalide and, as an activating agent, an alcohol; (6) aluminum amalgam, titanium tetrahalide and, as an activating agent, water; and (7) aluminum amalgam, titanium tetrahalide and, as an activating agent, an alcohol; said titanium tetrahalide being present in a ratio of 0.5 to 3 parts by weight, per part by weight of the aluminum compound, and said activating agent being present from about 0.2% to about 2.0% by weight of the catalyst mixture.

2. The method of polymerizing mono-olefins according to claim 1, wherein the polymerization is carried out in the presence of an inert liquid hydrocarbon solvent.

3. The process of claim 1 wherein the lower alkene is ethylene.

4. The method of polymerizing ethylene to produce predominately solid polyethylene which comprises heating ethylene in an inert atmosphere to a temperature upward of 100° C. at a pressure of at least 20 atmospheres gauge in the presence of a catalyst mixture comprising, essentially as active components, (1) aluminum carbide, (2) titanium tetrachloride, said titanium tetrachloride being present in a ratio of 0.5 to 3 parts by weight per part by weight of said aluminous compound, and (3) from about 0.2 to about 2.0% by weight of the catalyst mixture of an organic halogen compound.

5. The method of polymerizing ethylene into polyethylene in accordance with claim 4, wherein the polymerization is carried out in the presence of an inert liquid hydrocarbon solvent.

References Cited in the file of this patent

UNITED STATES PATENTS

| | | |
|---|---|---|
| 2,868,771 | Ray et al. | Jan. 13, 1959 |
| 2,881,156 | Pilar et al. | Apr. 7, 1959 |
| 2,886,561 | Reynolds et al. | May 12, 1959 |
| 2,913,446 | Cull et al. | Nov. 17, 1959 |

FOREIGN PATENTS

| | | |
|---|---|---|
| 874,215 | Germany | Apr. 20, 1953 |
| 1,132,506 | France | Nov. 5, 1956 |